Patented Jan. 5, 1937

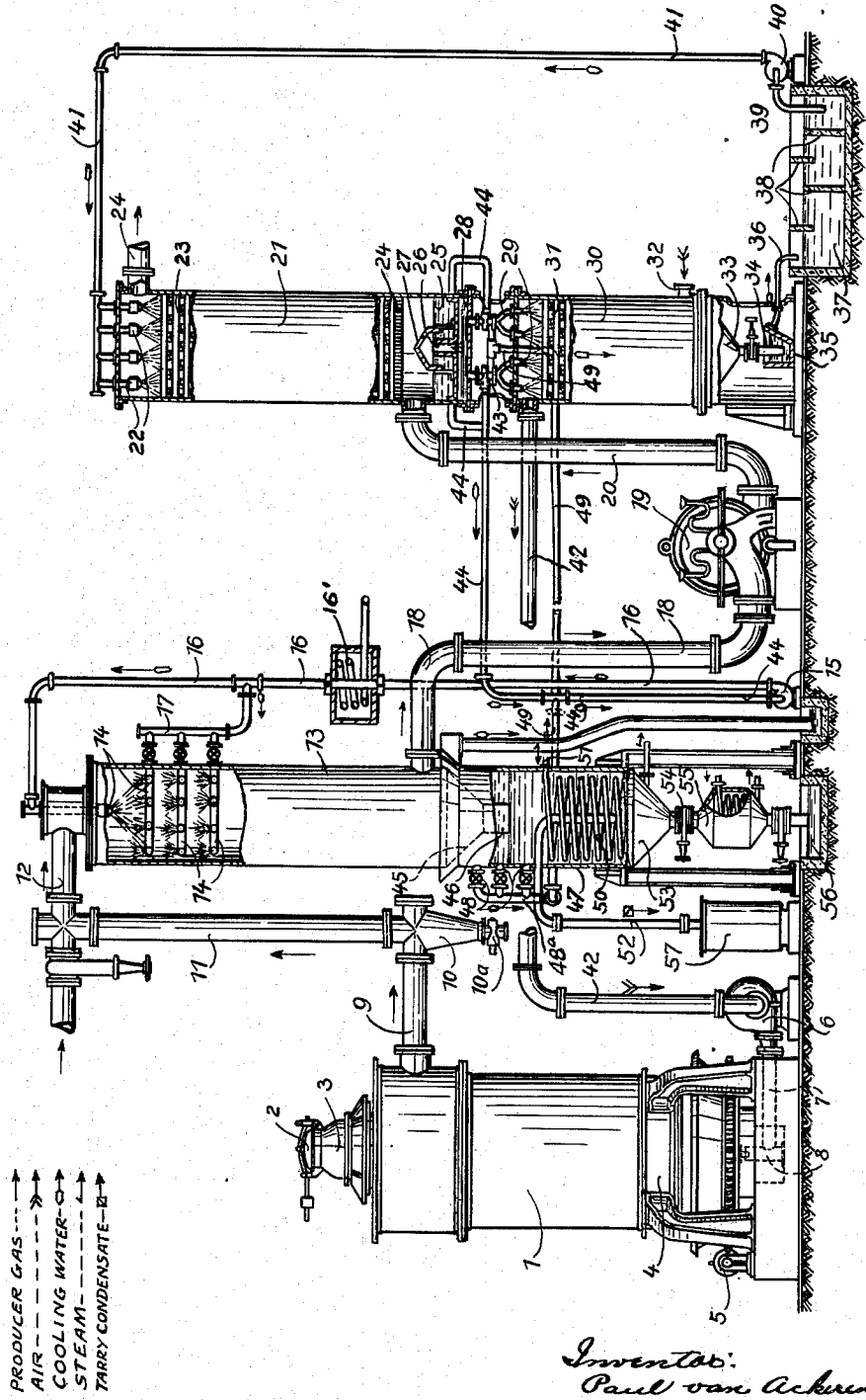

2,067,029

UNITED STATES PATENT OFFICE 2,067,029

ELIMINATION OF POISONOUS WASTE LIQUORS

Paul Van Ackeren, Essen, Germany, assignor, by mesne assignments, to Koppers Company, a corporation of Delaware Application June 16, 1933, Serial No. 676,069
In Germany June 18, 1932

1 Claim. (Cl. 48—203)

The invention relates to the elimination of poisonous waste liquors and more particularly to the removal of liquors which result from the removal of tar from gases produced by the gasification of bituminous fuels or coke.

It is usual to produce combustible gases from bituminous fuels or coke by burning these fuels in a so-called producer with a comparatively small quantity of air. Gases are thus formed which have a high content of carbon monoxide and which are used for various commercial purposes, for example, for heating regenerative metallurgical furnaces, coke ovens and the like. Further it is usual during the gasification of the said fuels in a generator to add a certain quantity of water vapor to the air for combustion which is frequently referred to as underfiring of air. The water vapor reacts with the incandescent carbon in the generator with the formation of water gas. As is well known water gas has a comparatively high calorific value. The calorific value of the producer gas is consequently also considerably increased by the water gas. The addition of water vapor to the air for underfiring the producer further has the action of causing a softer slag to be produced and of granulating the slag produced by the gasification of bituminous fuels or coke, thus considerably facilitating its removal from the generator. As regards this action, the amount of water vapor is in indirect ratio to the melting point of the slag, that is, the higher the melting point of the slag formed in the generator the smaller the amount of water which need be added for the purpose.

In gases produced by the gasification of bituminous fuels or coke therefrom certain quantities of tarry constituents are contained. These tarry constituents must be separated before conducting the gas to the points of combustion, in any case all those tarry constituents condense at normal or moderately high temperatures. If the tarry constituents are not separated from the gas before it is conducted away the tarry constituents are deposited in the pipe lines serving for the conveyance of the gas and clog these and the closing and the controlling members which control the gas passages.

The removal of the tarry constituents has hitherto generally been effected by cooling the hot gas which flows from the generator for example by bringing the gas into contact with cold water or cold washing oil. When the gas is so cooled there condenses in addition to the tarry constituents, also the water contained in the gas with the exception of that quantity which corresponds with the saturation of the gas at the temperature reached in the cooling stage. In the water condensed during the cooling of the gas are dissolved comparatively large quantities of certain poisonous organic compounds, particularly phenols, cresols and similar compounds. It is therefore not possible to allow gas water, which occurs by condensation of water vapor from the gas during the usual method of removing tars, to flow into streams in which the entire organic life would be effected by the phenols and similar compounds.

The object of my invention is to provide substantial improvements in the purification of such gases as are produced by gasifying bituminous fuels or coke in known generators by the simultaneous action of oxygen-containing gases, such as air and water vapor, which improvements enable the occurrence of poisonous waste liquors to be eliminated when purifying these gases.

A further object of the invention is to provide improvements in the purification of the gases specified in the preceding paragraph, which improvements enable the tarry constituents contained in the gas to be recovered in a pure condition in a simple manner and removed from the purifying apparatus.

A still further object of my invention is to provide improvements in devices for the purification of producer gases and the like, which improvements permit or promote the carrying out of the producer gas cooling process according to the invention.

Further objects of my invention will appear from the following description.

My present invention consists in a process of cooling producer gas which eliminates the production as an end product of poisonous waste liquors which occur during cooling, particularly during the direct cooling of these gases, which are produced by the gasification of bituminous fuels or coke by burning with a limited supply of air and in the presence of water vapor, the poisonous waste liquor being evaporated by being brought into contact with air and the air enriched with water thus obtained is used as the air for underfiring the producer to effect the gasification of the fuel. The fundamental idea of the invention may be carried out in various ways as will be set out in detail in the following description.

By introducing this poisonous waste liquor in the form of vapor into the gas producers the poisonous hydrocarbons and the like usually contained in the waste liquor are brought into the combustion zone of the gas producer and there burnt into non-injurious gases. In this manner there is obtained a complete elimination of the poisonous waste liquors in gas producer plants without it being necessary to use for the elimination of these waste liquors complicated apparatus which appreciably increase the expense of gas production.

For carrying out the process according to the invention there is preferably used a novel arrangement which substantially consists of a water tower, divided into two superposed parts, in the upper part of which there is effected the cooling of the hot generator gas and thus the formation of the poisonous waste liquor or poisonous condensed water, whilst in the lower water tower portion into which the poisonous waste liquor flows under the action of gravity, there is effected the evaporation of the poisonous waste liquor by bringing it into contact with air, which after being charged with water vapor is conducted into the air supply pipe of the gas producer.

In the accompanying drawing there is illustrated partly in side elevation and partly in vertical longitudinal section one embodiment of the invention.

In the arrangement illustrated in the drawing a suitable fuel, for example coke, is gasified in a gas producer 1. The gas producer 1 consists of a cylindrical casing, preferably provided with water cooling or a lining of refractory bricks, closed at the top and provided with a usual cover 2 having a charging hopper 3 for supplying the fuel to be gasified.

The shaft of the gas producer 1 is closed at the bottom by the usual rotary grate 4 which is kept in slow rotation by means of a motor 5 through the medium of reducing gear. Through the slots of the grate there is blown from underneath into the shaft casing, by means of a fan 6, a mixture of air and water vapor, the fan 6 being connected by the pipe 7 to the centrally located distributing pipe 8 of the rotary grate.

In the gas producer 1 the fuel is brought at a high temperature into contact with air and water vapor. The addition of water vapor is effected for two reasons. Firstly a formation of water gas is effected in the generator by the water vapor, whereby the efficiency of the generator and the calorific value of the gas is improved. Secondly the slag remaining from the gasification is softened or granulated by the water vapor. The quantity of water vapor to be added to the combustion air depends primarily on the constitution and composition of the slag formed at any time in the gas producer. A slag of high melting point requires a smaller addition of water vapor than a slag of low melting point. In the case of slags of the latter type as far reaching a granulation as possible is very desirable as such slags are very inclined to bake together.

The fuel to be gasified is brought in the gas producer at high temperatures into contact with a limited quantity of air, as a result of which combustion gases are formed which are rich in carbon monoxide. The gases also contain nitrogen, hydrogen, some carbon dioxide and certain quantities of tarry constituents which escape during the slow heating of the fuel in the gas producer shaft.

The gases produced in the gas producer are withdrawn through the pipe 9, they first pass through a dust separator 10, fitted with an outlet member 10a in which the gas stream is subjected to a change of direction, so that solid bodies together with certain high boiling substances are separated therefrom. The gas then passes through the pipes 11, 12, into the upper end of a washing device 13. In this device 13 the gas is brought into contact with hot water at a temperature which is somewhat above the dew point of the gas for water. The water is dispersed in the upper part of the washer 13 by distributing pipes 14 to which hot water is supplied by a pump 15 through the pipes 16, 17.

The gas leaves the washer 13 at the lower end through the pipe 18 and passes into a gas compressor 19 by means of which it is conducted through the pipe 20 into the lower part of the cooler 21. In the cooler 21 the gas, practically entirely freed from tar, is brought into contact with cold water which is introduced into the upper end of the device 21 by distributing means 22. The cooling device 21 is constructed as a direct cooler and is provided with wooden hurdles 23 on which the cooling water trickles downwardly from top to bottom in a state of fine division.

The cooled water finally leaves the device 21 through the pipe 26. The cold water serving to cool the gas in the device 21 is sprayed on to the wooden hurdles at the upper end by distributing means 22. The water collects at the bottom of the device 21 at 25. In the bottom of the device 21 is provided an overflow pipe 26 covered by a bell 27 which dips into the liquid collecting on the bottom of the device 21 in such a manner that the gas located inside the device 21 cannot escape through the overflow pipe 26, whereas the water can flow off through the overflow pipe 26.

The water flowing out through the overflow pipe 26 passes into an intermediate container 28 and from here flows through distributing means 29 on to the wood hurdles 31 provided in the lower compartment 30 of the washing tower.

The lower washing compartment 30 serves to cool the water which has been heated in the device 21. For this purpose there is provided at the lower end of the compartment 30 an air inlet pipe 32 through which the air can flow into compartment 30. The air which flows into compartment 30 comes into contact therein with the heated cooling water and produces an energetic evaporation of the finely divided water by which the temperature of the cooling water is lowered to the desired extent.

The cooled water collects on the conical bottom 33 of the washer compartment 30 and flows through a pipe 34, controlled by a valve, into a collecting trough 35 from which it passes through an overflow pipe 36 into a pit 37. In this pit are provided a number of partitions 38 which divide the pit 37 into different compartments. As will be seen from the drawing the cooling water flows through the pit in a zig-zag path, whereby the insoluble substances such as dust, breeze, etc., contained in the cooling water are deposited.

Finally the cold cooling water from the pit is drawn through the pipe 39 by means of the pump 40, and delivered into the pipe 41 which communicates with the cooling water distributing means 22 provided in the device 21.

For drawing cooling air into the washer compartment 30 there is provided the fan 6 which also serves for blowing the air into the producer. The fan 6 is for this purpose connected to the upper end of the washer compartment 30 by the pipe 42 which for the sake of clearness has only been shown in part in the drawing. In this manner the saturation of the cooling air with water vapor resulting from the re-cooling of the cooling water, is utilized for the generation of water gas in the producer 1, so that a separate device for saturating the undercurrent of air for the producer with water vapor is unnecessary.

When cooling the gas in the device 21 certain quantities of water vapor are also condensed from the gas. In this manner the quantity of cooling water circulating through the device 21, the washer compartment 30 and the pit 37 continually increases and it is necessary continually or in stages to remove a certain quantity of water from the circulation through the devices 21 and 30.

For this purpose a pipe 44 is connected by one of the three-way cocks 43 to the pipe leading from the intermediate container 28 to the distributing means 29. When the device is so connected the three-way cock 43 is so adjusted that only a certain quantity of water, which corresponds with the quantity of water condensed from the gas in the device 21 flows through the pipe 44. The valve 43, provided in the pipe leading to the other distributing means 29, being adjusted in accordance with the quantity of water to be conducted away through the pipe 44.

The pipe 44 is connected to the pump 15 by which hot water is conveyed into the washer compartment 13. As the water passing out through the pipe 44 has been more or less heated in the device 21 it is mostly unnecessary to provide a device for preheating the water which it is necessary to add continually or in stages to the washing liquid passing through the washer 13.

The hot water sprayed into the upper part of the washer 13 collects, together with the tarry constituents condensed from the gas, on the conical bottom 45 of the washer 13. The bottom 45 is provided with an outflow pipe 46 which projects into a container 47 located underneath the washer 13 in such a manner that the end of the outflow pipe 46 is always closed by the liquid which collects in the container 47 of the washing tower so that the gas in the washer 13 cannot flow out of the pipe 46.

The liquid remains in the container 47 a certain time which is sufficient to separate the tarry constituents from the water. The tarry constituents collect in the lower part of the container 47, whilst the water is withdrawn selectively through one of the three outflow pipes 48 arranged at different levels or through the overflow device 48a. The outflow pipes 48 each of which is controlled by a cock, are connected to the pipe 49 which is then connected (as indicated in dotted lines) the pipe 44 leading to the pump 15. By this pipe connection a circulation for the washing water is provided for, by means of which the tarry constituents are removed from the gas in the washer 13.

As the tarry constituents which collect in the container 47 are very viscous at normal temperature a device is provided in the container 47 for heating the liquid contained in the container. This device consists of a pipe coil 50 through which hot steam or the like passes.

The tar mass maintained at a high temperature and therefore easily flowing, may be withdrawn through a pipe provided in the conical bottom 53 of the container 47 and controlled by a controlling valve 54 into a storage tank 55 from which it can be discharged as required into the tar solidifying boxes 56. As shown in the drawing the storage tank 55 is also provided with a pipe coil for the purpose of heating the liquid contained in the container.

Instead of using the water flowing from the final cooling device 21 for saturating the undercurrent of air with water vapor, it is also possible for this purpose to use the water flowing from the preliminary cooler 13 or from the container 47. In this case the valves 43 are so adjusted that the whole of the cooling water flows from the final cooling device 21 through the pipe 44 of the pump 15 of the preliminary washer 13. Further the pipe 49 is then not connected, as indicated in dotted lines, to the pipe 44, but to the distributing devices 29 of the recooling or saturating device 30 as diagrammatically indicated in full lines in the drawing. The cooling and washing water then circulates continuously through the final cooling device 21, the precooler or prewasher 13, the container 47 and the saturating device 30 so as then to return from here again into the final cooling device 21.

In certain cases the separation of the tarry constituents from the washing water in the depositing container 47 causes difficulties. In such cases the liquid in the container 47 is preferably subjected to washing with an oil insoluble in water for example coal tar oil.

For the purpose of effecting this washing there is provided in the device shown in the drawing a pipe 52 which leads from an oil tank 57 into the tar container 47. The used oil which has been used for the oil washing can be withdrawn through this pipe 52 into the storage tank 57. Preferably in this case the lower end of the pipe 52 projecting into the container 47 is arranged to be adjustable in height in the known manner.

In the device shown in the drawing, it is not always necessary to provide a separate device for heating the washing water for the first stage. In many cases, as when the cooling water is passed from the cooler 21 directly into the aeration compartment 30, and only a portion of such water by-passed from 43 to 13, the heating of the tar separating container 47 suffices to heat the washing water to the necessary temperature. In particular cases it is of course also possible to include in the liquid circulation system for the washing water, for example, in the pipe 16 before the branching of the pipe 17, a heater 16' for the liquid.

It may also be preferable under circumstances to provide in the pipe 44, leading from the cold washer 21, a liquid heater for the purpose of bringing the cold water flowing from the washing device 21 to the temperature necessary in the washer 13.

Various changes may be made in the details disclosed in the foregoing specification without departing from the invention or sacrificing the advantages thereof.

In the claim attached to this specification no selection of any particular modification of the invention is intended to the exclusion of other modifications thereof.

I claim:—

In a process for direct cooling and washing of producer gas and the like from producers employing air saturated with steam for gas making which comprises, a preliminary stage in which the gas is substantially entirely freed of its tar by washing it while still hot from the producer with hot water at a temperature somewhat above the dew point of the gas for water, a final gas cooling stage in which the gas is subsequently finally cooled by washing with cold water, and an air saturation stage in which spent water hot from washing the hot gas is cooled by passing the air for gas making in the producer through the water to cool the same and saturate the air for making the producer gas; the improvement comprising flowing said water in series through the final cooling stage, then the preliminary cooling stage, thence the air saturation stage and thence back to the final cooling stage, heating the spent water from the final cooling stage while flowing to the preliminary stage, separating the tar from the spent water from the preliminary cooling stage prior to entering the air saturation stage, and cooling the spent water re-entering the final cooling stage down to a temperature which will condense water vapor present in the gas in the final cooling stage.

PAUL VAN ACKEREN.